Patented Apr. 17, 1945

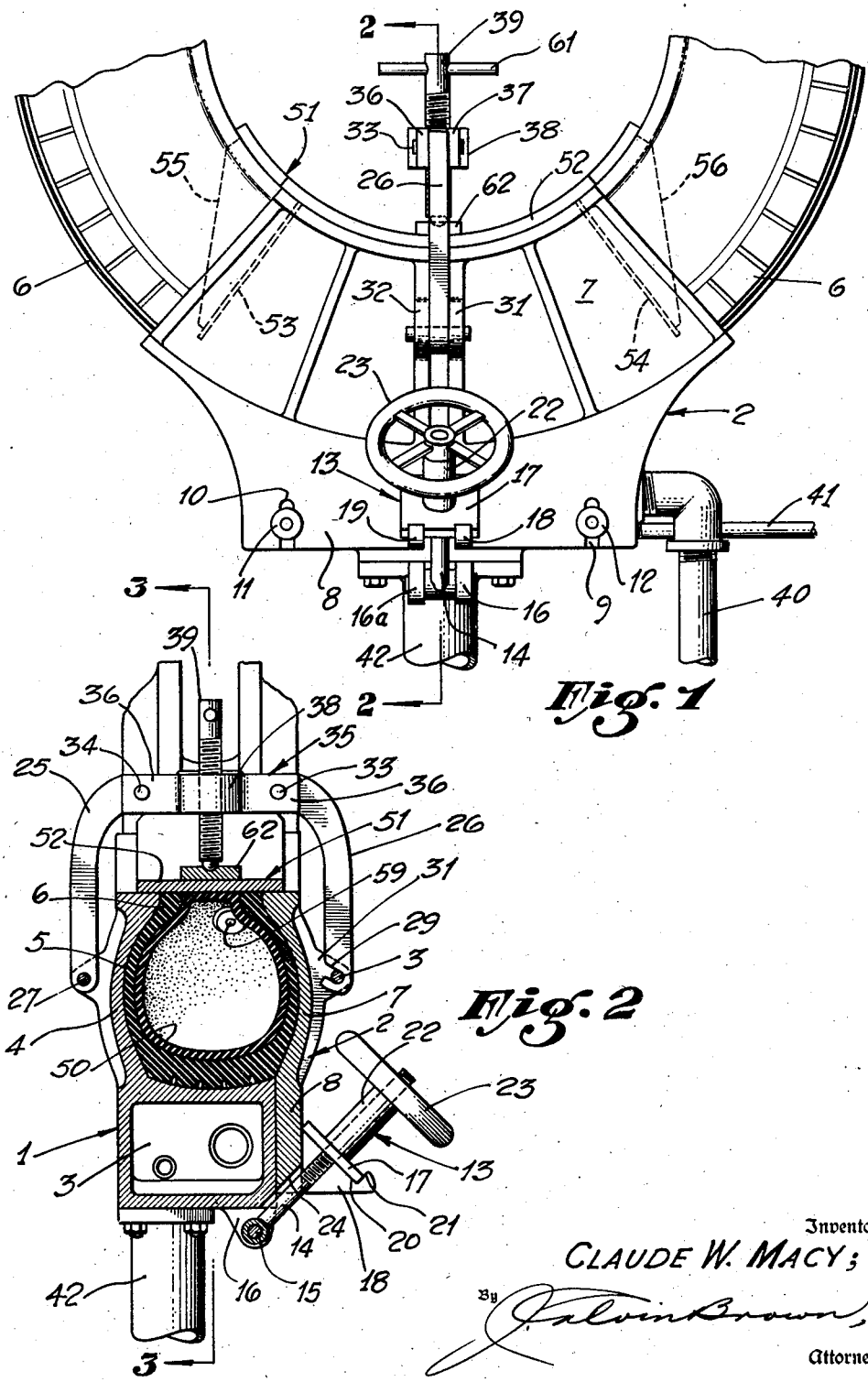

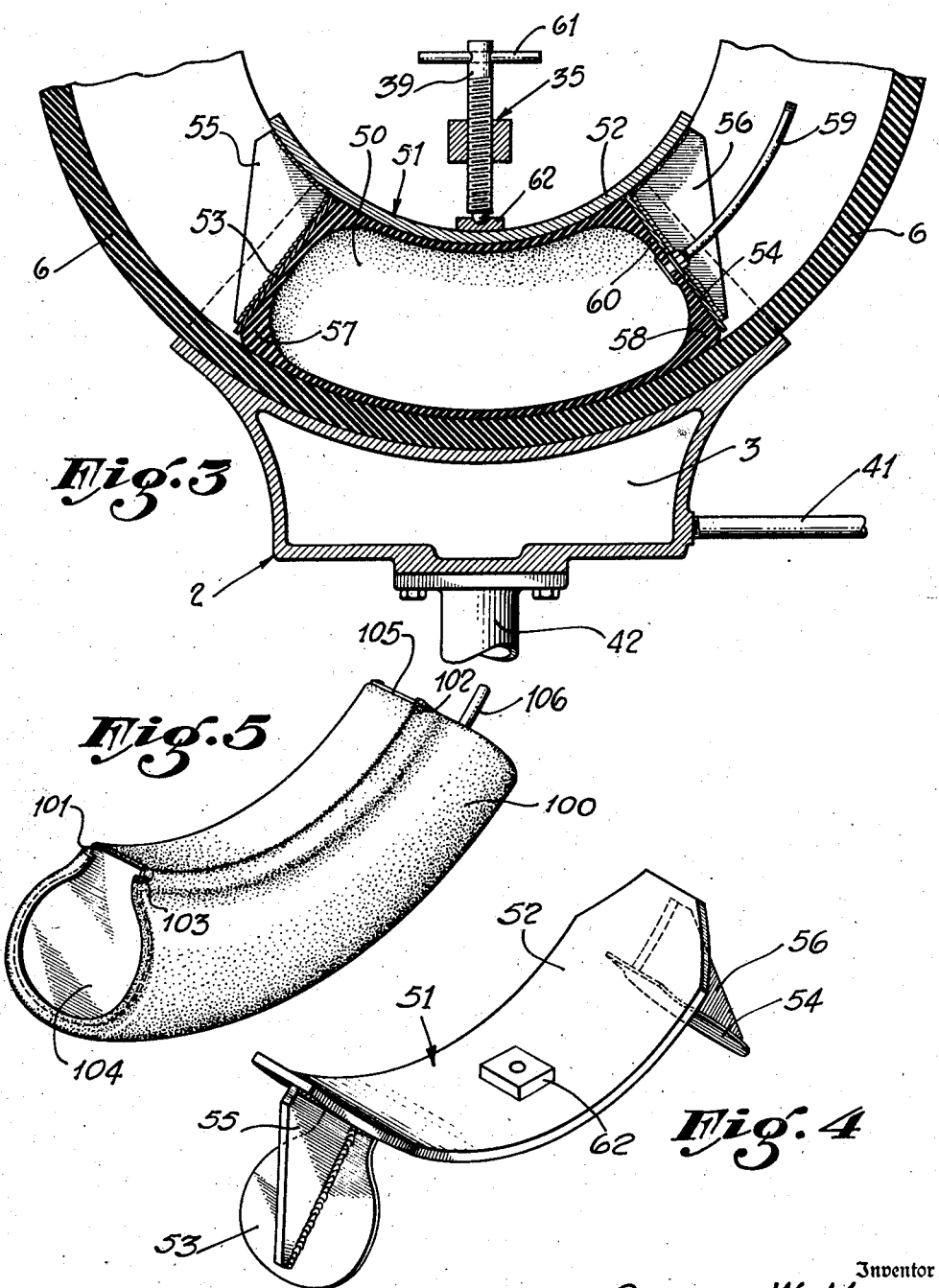

2,373,769

UNITED STATES PATENT OFFICE 2,373,769

TIRE REPAIRING DEVICE

Claude W. Macy, Pasadena, Calif.

Application August 17, 1942, Serial No. 455,093

1 Claim. (Cl. 18—18)

This invention relates to a tire repairing device, and has for an object the provision of means for effectively and efficiently holding an air bag against end expansion.

Another object consists in the provision of means aiding the proper vulcanization of a tire and which reduces the expense of certain operating factors.

At the present time, it is customary to provide what is known as an air bag for placement within a tire which is to be repaired by means of a patch and then vulcanized. These air bags are generally formed of heavy corded rubber, the cords being so arranged as to prevent end expansion in the bag. Most of these bags are made by hand and are quite expensive to purchase.

The present invention contemplates means which will hold a lightly constructed air bag in position within a tire, with assurance against blowout of said bag.

Another object of the invention is the provision of a novel form of air bag constructed so as to equalize expansion thereof under pressure.

The device is simple of structure, durable, capable of long use, and generally superior to devices now known to the inventor.

With the above mentioned and other objects in view, the invention consists in the novel and useful provision, formation, construction, association, and relative arrangement of parts, members and features, all as shown in certain embodiments in the accompanying drawings, described generally, and more particularly pointed out in the claim.

In the drawings:

Figure 1 is a fragmentary side elevation of a vulcanizing machine, with a member of the invention positioned relative to a tire carried by said machine, Figure 2 is a sectional view on the line 2—2 of Figure 1, Figure 3 is a fragmentary sectional view on the line 3—3 of Figure 2, Figure 4 is a perspective view of one element of the tire repairing device, and, Figure 5 is a perspective view of a modified form of the invention.

Referring now with particularity to the drawings, it is customary in the repair of tires to insert or apply over a blown out portion thereof, a rubber patch of some form. This patch is usually vulcanized to the tire carcass in a vulcanizing machine. However, during the vulcanization process, it is essential that the tire be held under pressure at the zone being vulcanized. Various means have been utilized for holding a tire area under pressuree, such as by the use of an air bag. These air bags usually are formed of heavy corded rubber and hand made. If an air bag of this type is damaged, it must be discarded with the entailment of considerable expense.

With my invention, I have provided means whereby a comparatively light resilient air bag may be held in working position within a tire carcass while the bag is under pressure and during vulcanization of the carcass.

As a general exposition of a vulcanization machine, reference is made to Figures 1 and 2, wherein I have shown a form of vulcanizing mold and which comprises two parts 1 and 2, the part 1 provided with a steam box 3 and with a side wall 4 integrally formed with the steam box and conforming on its inner surface 5 to the contour of a side wall of a tire 6. The part 2 of the mold has a wall 7, the inner surface of which conforms to the contour of the side wall of the tire. The part 2 is releasably held to the steam box casing. Specifically, the wall 8 of part 2 is slotted at 9 and 10 to allow the shanks of headed studs 11 and 12 projecting from the steam box casing to be received in said slots, while means 13 locks the wall 8 tightly to the steam box casing. The means 13 includes a swing bolt 14 pivotally anchored at 15 between brackets 16 and 16ª secured to the bottom wall of the steam box case. The bolt carries a lock plate 17, which plate is adapted to engage members 18 and 19 secured to part 2. Members 18 and 19 are identically formed and it will be observed upon reference to Figure 2 that both of these members have an inclined wall 20 and a ledge in substantially right angled relationship to the wall 20, as shown at 21. The plate 17 is carried on the ledges 21 and rests against the inclined walls 20 of members 18 and 19. Surrounding the screw-threads of the bolt 14 is an unthreaded sleeve 22. One end of this sleeve bears against a surface of the plate 17 and a hand wheel 23, threaded to the bolt, bears against the opposite end of said sleeve. Thus, upon turning the hand wheel, the sleeve forces the plate against the inclined walls 20 and draws the member 2 into tight engagement with member 1. It will also be observed that to accommodate the swing bolt, an inclined slot is formed in the parts 1 and 2, as shown at 24.

In addition to the elements just enumerated, other means are provided for locking the parts in working relationship, which consists in the provision of swing arms 25 and 26, arm 25 being pivoted at 27 between a pair of studs 28 formed on the exterior surface of the part 4 of member 1, while arm 26 has a hook end 29 adapted to engage a pin 30 extending between a pair of studs 31 and 32 formed on the exterior surface of part 2. Arms 25 and 26 are swingingly secured at their opposite ends by pins 33 and 34 to means 35. This means comprises two members 36 and 37 centrally carrying therebetween a nut 38. This nut, in turn, accommodates a pressure screw 39. Steam admission and exhaust pipes leading to the steam box are shown at 40 and 41.

The device just described may be conveniently mounted upon a pedestal of some type, the post of which is shown at 42. As illustrated, the side walls of the casing parts 1 and 2 and which embrace the tire, are generally arcuate and segmental in form. This construction is followed for the reason that the entire tire carcass is not to be vulcanized but only a particular area.

When a tire has been damaged due to blowout, deep cuts, or otherwise, rubber is applied over the blowout or damaged portion and vulcanized to the tire. However, during the vulcanization, it is essential that the patch be held against the rubber of the tire, under pressure. Accordingly, I have provided an air bag 50 which is placed within the tire carcass and member 51, which includes a pressure plate 52 and end plates 53 and 54 conforming in outline to the general contour of the interior of the tire carcass. The pressure plate 52 is arcuate in form and the end plates 53 and 54 are secured to the convex surface of said pressure plate in any approved manner, such as by welding or brazing, with said end plates braced by webs 55 and 56, said webs being brazed or welded to the exterior surfaces of the end plates and to a portion of the convex surface of the pressure plate 52. The end plates 53 and 54 are of such dimension as to provide a slight clearance between the edge thereof and the interior of the tire carcass.

The air bag 50 is formed of an expansible material, such as rubber or rubber composition, is preferably thin-walled, and without any corded reinforcement. This air bag is segmental in form and adapted to be positioned between the end plates, as shown in Figure 3. The bag is thickened annularly adjacent the ends thereof as indicated at 57 and 58. This thickening of the ends allows an equalization in expansion of the bag when the bag is placed under air pressure. It will be observed that a tube 59 is secured to the end 60 of the air bag and communicates with the interior thereof. This tube is adapted to have air or other medium passed therethrough for reception within the bag.

When it is desired to use the construction shown in Figure 3, the hook end of the arm 26 is released from the pin 30, which permits the parts to swing upwardly carrying the means 35. The hand wheel 23 is revolved so as to release the plate 17 from members 18 and 19 and permit the side 2 to be removed. The tire carcass with the patch is then placed in proper position in the mold. The bag 50 and member 51 are already in place within the tire, whereupon the side 2 is replaced, the arm 26 swung downwardly to cause the hook thereof to engage the pin 30, and the hand wheel 23 operated so as to hold the side 2 to the steam box casing of the side 1. The screw 39 is turned by the arms 61 to exert a downward pressure against a transverse piece 62 carried on the pressure plate 52 and force the pressure plate into tight engagement with the arcuate tops of the members 1 and 2. The bag 50 has air introduced within the same so that the tire carcass, patch and mold are in pressure engagement. Vulcanization then proceeds in the usual manner by introducing steam within the steam box for the desired period of time. It takes but a few minutes of a workman's time to place a tire in the mold with the parts 50 and 51 in position. When air under pressure is admitted within the bag, the bag will expand against the inner surface of the tire and exert an even pressure thereagainst. End expansion of the bag is prevented by the end plates 53 and 54 of member 51. Hence, a light bag can be used and if damaged, is easily replaced with a minimum of expense.

In the showing of Figure 5, I have modified the invention slightly, wherein a bag 100 is so molded as to be in segmental form and of a configuration generally conforming to the interior of a tire. Ends of said bag are enlarged or thickened at 101 and 102 and provided with end grooves, one of which is shown at 103. Groove 103 conforms to the outline of the bag, as indicated by the dotted lines. Adapted to be placed in the groove at each end of the bag are metal plates 104 and 105. These plates are vulcanized to the bag. The usual air tube 106 is provided for one end of the bag so that air may be admitted therein, under pressure.

The construction illustrated in Figure 5 is such as to prevent end blowout of the bag during a vulcanizing process, and has an advantage over the usual corded rubber bag because of its cheapness of construction.

The combination of the members 50 and 51 constitute what may be termed a vulcanizing core and wherein the member 50 is confined between the plates of the rigid member for limiting expansion of the member 50 in three directions, or along its convex surface. In using the term "convex surface," I intend to imply that, viewing Figure 3, such expansion of member 50 as would occur is against the inner wall of the tire casing. This portion would be the sides of the tire to force the tire into engagement with the inner surfaces of the side walls 4 and 7 and that portion which includes the tire tread.

I claim:

As a new article of manufacture, an arcuate metal plate, a pair of pear-shaped metal members spaced apart and each secured to the convex surface of said arcuate metal plate inwardly of the ends thereof, and webs secured to said pear-shaped plates and the convex surface of said arcuate plate, each web being positioned between the end of the arcuate plate and its respective pear-shaped member.

CLAUDE W. MACY.